United States Patent [19]

Neefe

[11] 4,447,474
[45] May 8, 1984

[54] METHOD OF SELECTIVELY TINTING SOFT CONTACT LENSES

[76] Inventor: Charles W. Neefe, P.O. Box 429, 811 Scurry St., Big Spring, Tex. 79720

[21] Appl. No.: 412,872

[22] Filed: Aug. 30, 1982

[51] Int. Cl.³ .................. B05D 1/28; B05D 7/04; G02B 3/00; G02B 1/10
[52] U.S. Cl. ..................................... 427/164; 8/507
[58] Field of Search .......................... 427/164; 8/507

[56] References Cited

U.S. PATENT DOCUMENTS 4,157,892 6/1979 Tanaka et al. .................. 8/507
4,329,378 5/1982 Tarumi et al. ............. 427/429 X Primary Examiner—James R. Hoffman

[57] ABSTRACT

A method of tinting specific areas of soft contact lenses by placing the dye in a dye carrier made of a porous material of the size and shape of the area to be tinted. The soft lens is placed on the dye carrier and absorbs the dye in the selected pattern.

5 Claims, 3 Drawing Figures

METHOD OF SELECTIVELY TINTING SOFT CONTACT LENSES

PRIOR ART

Hard contact lenses have been available in many colors for over twenty years. Iris patterns have been placed inside both hard and soft contact lenses. The solid colored hard lenses are colored by adding the colorants to the monomer in the liquid state and polymerizing the colored monomer to form the colored hard lens material. Iris pattern lenses, both hard and soft, are made by laminating the painted or printed iris pattern inside the lens material. Spin casting is one of the most used methods of producing soft contact lenses. The lenses are produced in concave rotating molds so that colored lenses with a clear peripheral area are impossible to produce. If the colored area is allowed to extend to the edge it will be most visible and unattractive as the soft lenses are larger than the iris and extend over and cover part of the white part of the eye.

Lathe cut soft lenses are made from clear material in the xerogel state and later hydrated to produce soft lenses. Hydrated lathe cut soft lenses may also be tinted by the present invention.

IN THE DRAWINGS

The acid dyes, known as azo dyes, containing nitrogen to nitrogen bonds —N=N— may be used to practice the invention as may the dyes known as reactive dyes and the sulphur dyes. The sulphur dyes are fixed or made fast by removing the sodium sulphide which made the dye soluble. Reactive dyes require no special fixing step, only extraction of unreacted dye, as they react chemically with the lens material and are thus made permanent. The properties of dyes are well known to the art.

Practicing this invention, many different shaped colored patterns are possible as well as multicolored patterns by using two or more lens supports having different shaped patterns and colors. Transparent and translucent colors are also possible by selecting colorants which produce the desired qualities.

DESCRIPTION OF THE PRESENT INVENTION

Figure 1:
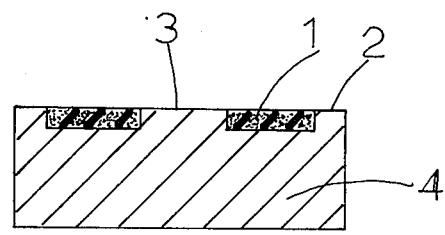
FIG. 1 shows the lens support and dye carrier in the flat configuration, in section.
Figure 2:
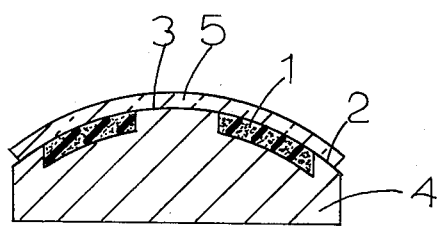
FIG. 2 shows the lens support and dye carrier with a lens in place in the convex configuration, in section.
Figure 3:
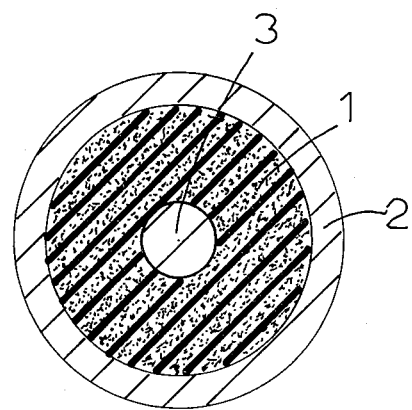
FIG. 3 shows the lens support and dye carrier from the top.

A lens carrier 4 FIGS. 1 and 2 is made from a durable material impervious to liquid dyes such as stainless steel, brass, aluminum or acrylic plastic. The lens support may be flat as in FIG. 1 or convex as in FIG. 2 or concave. A recess the size and shape of the desired colored pattern is cut into the surface of the lens support. A peripheral zone 2 FIGS. 1, 2 and is provided. A central pupil zone 3 FIGS. 1, 2 and is also provided. These areas will provide a lens having a clear pupil area and a clear peripheral area. The central pupil area 3 FIGS. 1, 2 and 3 may be omitted for transparent colors and the peripheral zone 2 FIGS. 1, 2 and 3 only used. The recessed area is fitted with a firm dye absorbent material 1 FIGS. 1, 2 and 3 such as hard felt, polyurethane foam, firm sponge rubber, gelatin or polyhydroxyethylmethacrylate soft contact lens material. The lens support 4 FIGS. 1 and 2 and dye carrier 1 FIGS. 1, 2 and 3 is placed in a strong dye solution and allowed to permeate the dye carrier 1 FIGS. 1, 2 and 3. The dye charges lens carrier is removed from the dye bath and surplus dye is wiped from the surfaces 2 and 3 FIGS. 1, 2 and 3. The soft lens 5 FIG. 2 is placed on the surface of the lens carrier. The dye is allowed to migrate from the dye carrier 1 FIGS. 1, 2 and 3 and will be absorbed into the structure of the lens 5 FIG. 2. When sufficient dye has migrated into the lens, the lens is removed and the dye is fixed to render it permanently in the lens. The lens support may be flat as in FIG. 1. The soft lens is pressed against the flat surface to absorb the dye. A concave lens support may also be used in which case the convex surface of the lens is placed on the concave surface of the lens support.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of coloring selected portions of a soft contact lens by the steps of providing an impervious lens support, substantially the size and shape of the contact lens to be colored, placing an absorbent dye carrier material of a size and shape equal to the lens area to be colored in the surface of the lens support, allowing a liquid colorant to be absorbed into the absorbent dye carrier material, providing an uncolored central circular pupil area and an uncolored peripheral area, placing the lens surface in contact with the surface of the lens support and the dye carrier material, allowing the colorant present in the dye carrier material to be absorbed into the lens at the selected lens area and chemically reacting the dye substance to render it insoluble and permanent.

2. A method as in claim 1 wherein the lens support is flat.

3. A method as in claim 1 wherein the lens support is convex.

4. A method as in claim 1 wherein the lens support is concave.

5. A method as in claim 1 wherein multiple lens supports having different colors and different shaped dye carrier materials are used to color one lens.

* * * * *